(12) United States Patent
Kurudi Matada et al.

(10) Patent No.: US 10,608,932 B2
(45) Date of Patent: Mar. 31, 2020

(54) REFRESH FLOW ENTRY

(71) Applicant: Hewlett-Packard Development Company, L.P., Houston, TX (US)

(72) Inventors: Sandeep Kurudi Matada, Karnataka (IN); Sonali Rajput, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/688,888

(22) Filed: Apr. 16, 2015

(65) Prior Publication Data

US 2016/0254997 A1    Sep. 1, 2016

(30) Foreign Application Priority Data

Feb. 28, 2015   (IN) .............. 980/CHE/2015

(51) Int. Cl.
*H04L 12/741* (2013.01)
*H04L 12/715* (2013.01)
*H04L 12/759* (2013.01)

(52) U.S. Cl.
CPC ............ *H04L 45/64* (2013.01); *H04L 45/028* (2013.01)

(58) Field of Classification Search
None
See application file for complete search history.

(56) References Cited

U.S. PATENT DOCUMENTS

| 8,964,751 | B2 * | 2/2015 | Anumala | ................ | H04L 45/54 370/392 |
|---|---|---|---|---|---|
| 2011/0310901 | A1 | 12/2011 | Uchida et al. | | |
| 2014/0098669 | A1 | 4/2014 | Garg et al. | | |
| 2014/0337674 | A1 | 11/2014 | Ivancic et al. | | |
| 2015/0009827 | A1 * | 1/2015 | Kawai | .................... | H04L 45/64 370/235 |

FOREIGN PATENT DOCUMENTS

WO    WO-2013125342 A1    8/2013

OTHER PUBLICATIONS

Mizrahi, T, et al, "On the Necessity of Time-based Updates in SDN", Feb. 11, 2014.
Reitblatt, M et al, "Abstractions for Network Update", Aug. 13-17, 2012.

\* cited by examiner

*Primary Examiner* — Willie J Daniel, Jr.
(74) *Attorney, Agent, or Firm* — Park, Vaughan, Fleming & Dowler LLP (57) ABSTRACT

A first flow entry includes match parameters and an action. A second flow entry includes match parameters and which are the same as the match parameters and the action of the first flow entry. The first flow entry and the second flow entry are refreshed.

20 Claims, 8 Drawing Sheets

| Match Paramaters | Action | Timeout | Priority |
|---|---|---|---|
| DNS request | Forward to security device | Z seconds | X+1 |
| DNS request | Forward to security device | Z seconds | X |

REFRESH FLOW ENTRY

CLAIM FOR PRIORITY

The present application claims the benefit of foreign priority under 35 U.S.C. § 119(a)-(d) to Indian patent application number 980/CHE/2015 having a filing date of Feb. 28, 2015, the disclosure of which is hereby incorporated by reference in its entirety.

BACKGROUND

As used herein the term network device refers to a device for forwarding data such as a layer 2 switch, layer 3 switch or router etc. A network device includes a control plane which determines forwarding policies and a data plane which carries out the actual forwarding of data. The data plane includes a forwarding table which stores forwarding entries. The forwarding entries may be programmed into the forwarding table by the control plane. The control plane may generate the forwarding entries based on data forwarding policies and manage the forwarding entries in the data plane. In a traditional approach to networking, both the control plane and the data plane are located in the network device. That is the network switch has a local control plane that manages the data plane of the network device.

Software defined networking (SDN) is an approach in which the control plane and the data plane are handled by separate devices. A SDN network device includes a forwarding table and forwards traffic flows based on the contents of the forwarding table. However, the data plane of a SDN network device is managed by a remote SDN controller, rather than a local control plane of the network device. The remote SDN controller may, for example, be a server which acts as an SDN control plane. The SDN controller may, for example, instruct adding entries to, or deleting entries from, the SDN switches forwarding table. The OpenFlow Protocol (OFP) is one example of an SDN protocol which is currently gaining acceptance in the marketplace.

In one known approach to network security, a SDN network device has a flow entry with an action to forward DNS requests to a SDN controller. On receiving the forwarded DNS request, the SDN controller carries out a security check on the requested domain name, sends a response denying access if the domain name is considered dangerous, or sends the DNS request back to the SDN network device for forwarding to a DNS server if the domain name is considered safe.

BRIEF DESCRIPTION OF THE DRAWINGS

In the following description the terms "a" and "an" are used to denote the presence of one or more of a particular element. The phrase "a material selected from the group comprising" following by a list of materials means the material comprises one or more materials selected from the list.

Examples will now be described in more detail with reference to the accompanying drawings.

DETAILED DESCRIPTION

A flow entry in a forwarding table of a network device may include match parameters and an action. The match parameters specify at least one characteristic of a flow that matches the flow entry, for example a source address, destination address, virtual local area network (VLAN), ingress port, packet type etc. The action specifies what action the network device performs on incoming packets that match the flow entry. For example, the action may be to forward the packet through a particular port, modify the packet, forward to a controller for further processing, or drop the packet etc.

A flow entry may be refreshed by modifying a part of the flow entry or re-writing the entire flow entry. If the processor is busy with other tasks, then there may be a delay in the refreshing process. As a result packets entering the network device before the refresh is complete, may escape the flow entry. That is, if there is a delay in refreshing a flow entry, then packets which would otherwise match the flow may be dropped, or forwarded in accordance with other flow entries which would usually have a lower priority.

The present disclosure proposes a first flow entry and a second flow entry which both have the same match parameters and same action. The first flow entry and second flow entry are refreshed alternately. Refreshing the first flow entry and the second flow entry alternately, means that the first flow entry and the second flow entry are refreshed in an alternating sequence. Thus the first flow entry is refreshed, then the second flow entry is refreshed, then the first flow entry is refreshed again, then the second flow entry is refreshed again etc.

In this way the second flow entry may act as a backup for the first flow entry. When the first flow entry is being refreshed, incoming flows that match the match parameters may be handled in accordance with the second flow entry. Similarly, when the second flow entry is being refreshed, incoming flows that match the match parameters may be handled in accordance with the first flow entry. This minimizes the risk of packets escaping a flow entry if there is a delay in refreshing the flow entry.

A flow entry may also include a timeout. A timeout specifies a time period for which the flow entry is valid. After a timeout has expired a flow entry is no longer valid and may be deleted. One type of timeout is a hard timeout which specifies an absolute time after which a flow entry expires. This is distinct from a soft timeout which specifies a relative period of time after which a flow entry expires if not matching packet has been received.

A flow entry may also include a priority. A priority specifies a relative priority of the flow entry relative to other flow entries. A priority may for example be a number, with a higher number indicating a higher priority. For example, when a new packet is received by the network device it may first be compared to flow entries having a higher priority before comparing to flow entries having a lower priority, or may be processed according to a matching flow entry having a higher priority in preference to any other matching flow entries that have a lower priority.

There are many situations in which it may be useful to alternately refresh a first flow entry and second flow entry having the same match parameters. Some specific examples will now be described.

Figure 1A:
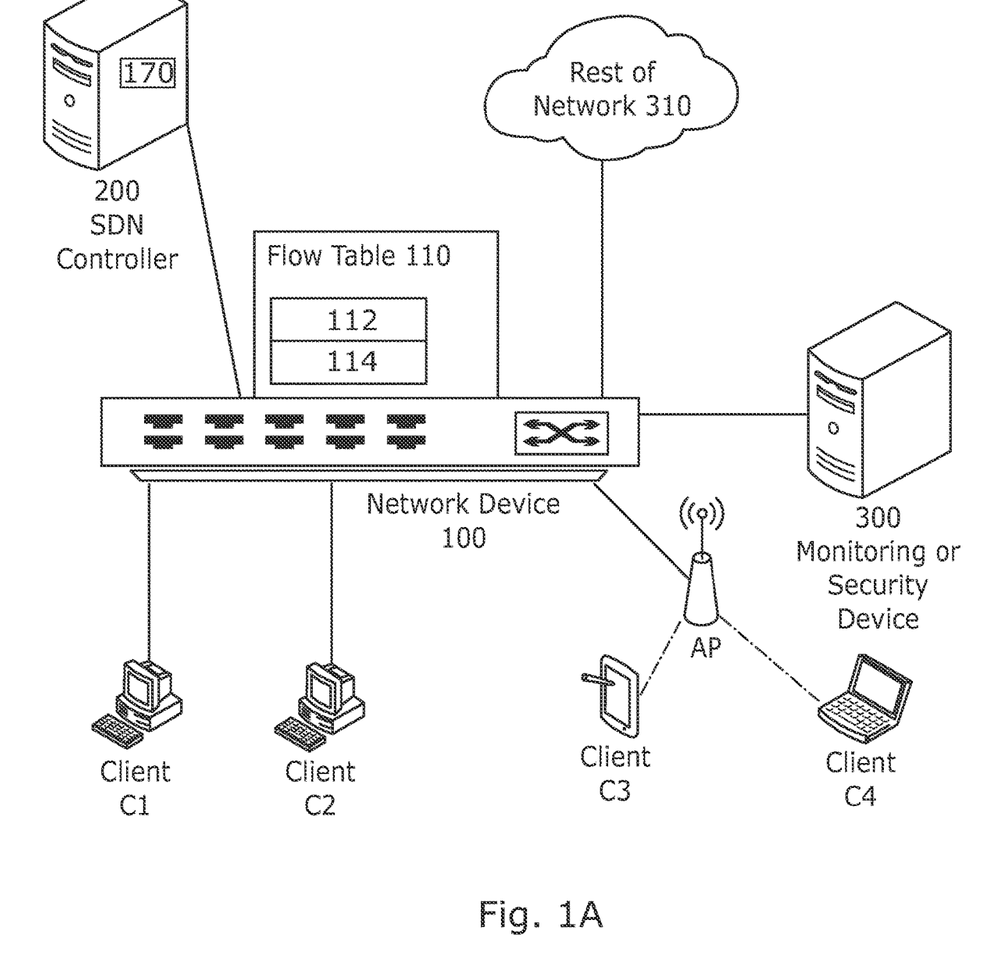
FIG. 1A shows an example of a network according to the present disclosure.

FIG. 1A shows a schematic example of a network in which a method according to the present disclosure may be implemented. The network includes a plurality of client devices C1, C2, C3 and C4 that are connected to a network device 100. The client devices may be personal computing devices, such as desktop computers, notebook computers, tablet computers etc. The clients may be connected by a wired link, as shown for C1 and C2, or by a wireless link, for example via an Access Point (AP) as shown for C3 and C4.

The network device 100 may be a software defined networking (SDN) network device that is managed by a remote SDN controller 200. The SDN controller 200 may communicate with the network device 100 over a channel and send instructions to add flow entries, delete flow entries and update flow entries in a forwarding table 110 of the network device. Two flow entries 112 and 114 are shown in FIG. 1. The flow entries 112 and 114 may be to re-direct certain types of flow to an external device 300. The external device 300 may for example be a traffic monitoring device to monitor traffic passing through the network, or a security device to inspect traffic passing through the network.

The external device may for instance process the re-directed traffic to log it for traffic monitoring purposes or carry out security checks for security purposes, before sending the re-directed traffic back to the network device for normal processing by the network device. Which traffic is diverted to the external device 300 depends upon the match parameters of the flow entries 112 and 114. For example, the flow entries 112 and 114 may specify re-direction of all traffic, or redirection of traffic received from wireless devices C3 and C4, but not of traffic received over a wired connection such as from C1 and C2, or redirection of particular types of traffic.

In one example, the flow entries 112 and 114 match domain name server requests (DNS) received on a port connected with a client device and have an action to redirect the DNS to security device 300. The security device 300 may determine if the DNS request relates to a malicious or undesirable web addresses by comparison with a database or otherwise. If the DNS request is determined to be malicious or undesirable, then the security device notifies the client that the requested address is prohibited or cannot be found. If the DNS request is determined to be okay, then the security device 300 returns the DNS request to the network device 100. The network device then forwards the returned DNS request to a DNS server which is reachable through the rest of the network 310.

The above description of redirecting a DNS request is one specific example of a more general principle of redirecting traffic to an external device for security or monitoring purposes. Flow entries that have an action to re-direct traffic to an external device for security or monitoring purposes, may have a hard timeout specifying a time after which the flow entry expires. This helps to limit the extent of disruption in the event that the external device, or an application running on the external device, crashes or becomes un-reachable.

The flow entries may be refreshed periodically when the external device is working normally, but not refreshed if the external device, or relevant application on the external device, crashes or becomes unavailable. If there was no timeout then traffic may be re-directed to the unreachable destination indefinitely. However, with the timeout, if the external device crashes, then re-directed traffic is lost, but traffic will cease to be redirected after both the timeout of the first flow entry and timeout of the second flow entry have expired.

As explained above the first flow entry 112 and the second flow entry 114 are refreshed alternately. This helps to ensure that, even if there is a delay in refreshing one of the first and second flow entries, then matching flows may still be forwarded according to the other flow entry. This is particularly applicable to the situation where the flow entries have hard timeouts, but may also be applicable in other situations where for whatever reason one of the flow entries may be temporarily lost. Further, in many situations, and especially for security, if there is just one flow entry then even a small delay of a few milliseconds in refreshing the flow entry may allow a packet to escape. Having first and second flow entries with the same match parameters and action and refreshing the first and second flow entries alternately helps to prevent packets from escaping. A module 170 of the SDN controller may instruct the refreshing of the first flow entry and second flow entry in alternating manner.

Figure 1B:
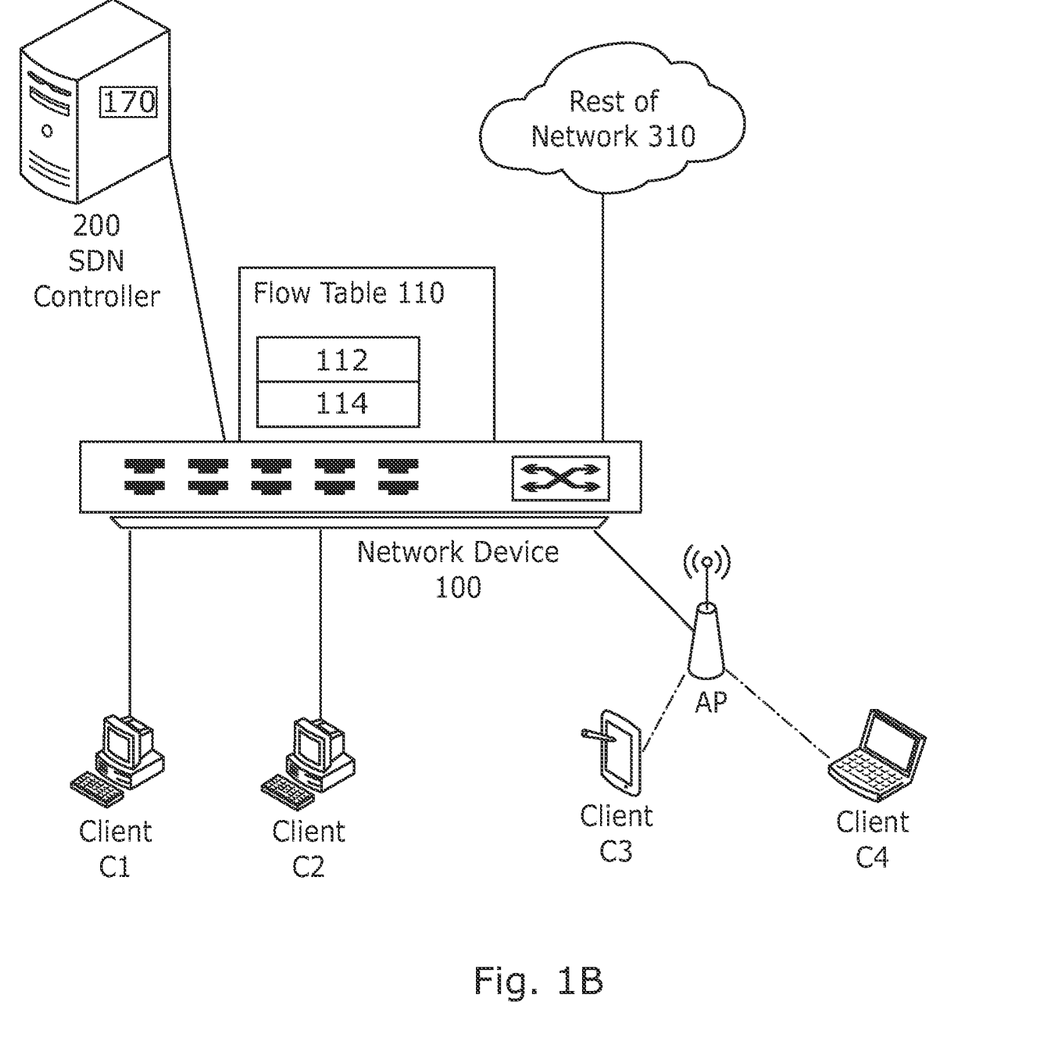
FIG. 1B shows another example of a network according to the present disclosure.

In the example of FIG. 1A, the SDN controller 200 is separate from the security or traffic monitoring device 300. However, in the example of FIG. 1B the SDN controller 200 itself acts as a security device or a traffic monitoring device. In this case the module 170 of the SDN controller may be a security application or traffic monitoring application. The application may be responsible for writing the first and second flow entries to the network device and receiving flows diverted by the first or second flow entry. Further, the security application or traffic monitoring application may process the received flows before sending the flows back to the network device for normal forwarding, or sending a message indicating the flows are not to be forwarded for security reasons. The security application or traffic monitoring application 170 may also be responsible for refreshing the first flow entry and the second flow entry alternately. In this way, during normal operation, at least one of the flow entries should be valid at any given time. The first flow entry and second flow entry may have respective hard timeouts. If the application crashes it will stop refreshing the first and second flow entries and after the timeouts of the first and second flow entries have expired, the network device will cease forwarding flows to the application.

Figure 2:
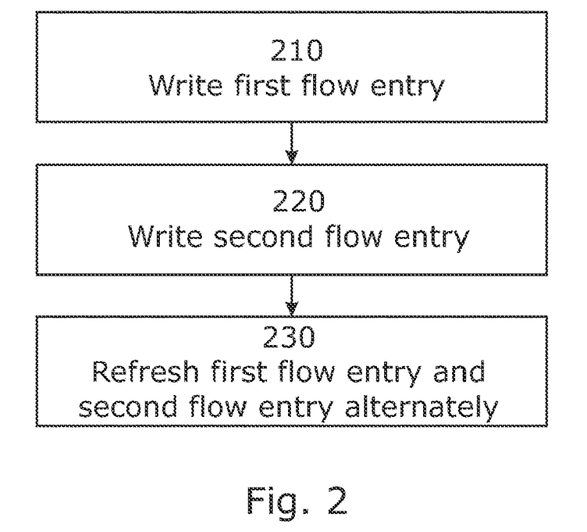
FIG. 2 shows an example of a method according to the present disclosure.

FIG. 2 shows an example from perspective of the control plane, e.g. SDN controller.

At block 210 a first flow entry is written to the forwarding table. For instance the SDN controller 200 may send an instruction to the network device 100 to write the first flow entry.

At block 220 a first flow entry is written to the forwarding table. For instance the SDN controller 200 may send an instruction to the network device 100 to write the second flow entry.

The second flow entry has the same match parameters and same action as the first flow entry. In this way the second flow entry may act as a backup for the first flow entry and vice versa. The first flow entry may have a different priority than the second flow entry in order that the flow entries do not conflict with each other.

At block 230 the first flow entry and the second flow entry are refreshed alternately. There are various ways in which a flow entry may be refreshed. For example, the SDN controller 200 may refresh the first flow entry by sending instructions to the network device 100 to delete the first flow entry and then re-write the first flow entry. Or the SDN controller 200 may refresh the first flow entry by sending instructions to the network device to overwrite the first flow entry, without first deleting the first flow entry. Or the SDN controller 200 may refresh the first flow entry by sending instructions to update the first flow entry, for instance by amending or re-setting a timeout of the first flow entry. Likewise, the SDN controller 200 may send similar instructions to refresh the second flow entry. The first and second flow entries may be refreshed in turn, one after the other, in an alternating sequence.

Figure 3:
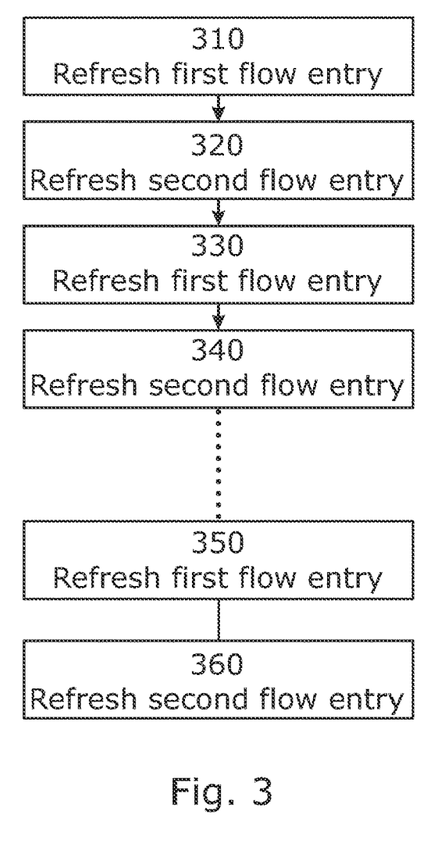
FIG. 3 shows an example of a method according to the present disclosure.

FIG. 3 shows an example of the alternating refresh in practice. At block 310 the first flow entry is refreshed. At a later time at block 320 the second flow entry is refreshed. Then at a later time at block 330, the first flow entry is refreshed again. At a still later time at block 340 the second flow entry is refreshed again. This refreshing may go on as long as it is desired to keep the flow entries in force. Thus at block 350 the first flow entry is refreshed for a Nth time and at block 360 the second flow entry is refreshed for a Nth time. This refreshing process may stop if it is determined that the flow entries are no longer desired, or if an entity sending the refresh instructions crashes. For instance, if a security application on the SDN controller crashes, or determines that the security device 300 is no longer reachable or no longer acting normally.

Figure 4:
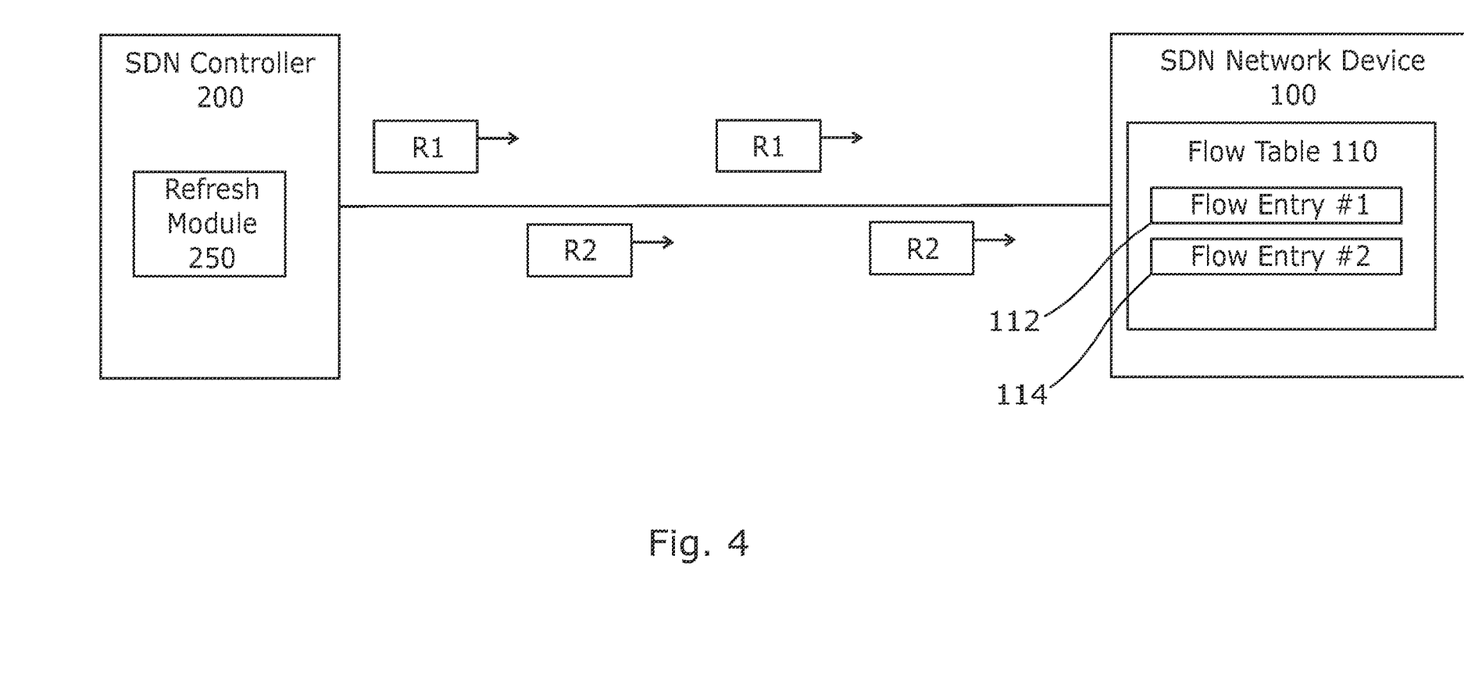
FIG. 4 shows an example of a method according to the present disclosure.

FIG. 4 is a general example showing a refresh module 250 on a SDN controller 200 sending refresh instructions to a SDN network device 100. The instructions R1 are to refresh the first flow entry 112, while the instructions R2 are to refresh the second flow entry 114. The refresh instructions are spaced out in time from each other and may be send periodically.

In one example, a single fixed rate scheduler may be used to send the refresh instructions every predetermined period of time T. In this case the single fixed rate scheduler alternates between sending instructions R1 to refresh the first flow entry and instructions R2 to refresh the second flow entry. For instance at time T an instruction to refresh the first flow entry may be sent, at time 2T an instruction to refresh the second flow entry may be sent, at time 3T an instruction to refresh the third flow entry etc. Using a single fixed rate scheduler is simpler and consumes less processor time, than using a separate scheduler for each of the flow entries. It also helps to prevent the first and second flow entries being refreshed simultaneously; for instance if a first scheduler refreshed the first flow entry every 2 seconds and a second scheduler refreshed the second flow entry every 3 seconds, then both flow entries would be refreshed at 6 seconds. Using a single rate scheduler avoids this.

Figure 5:
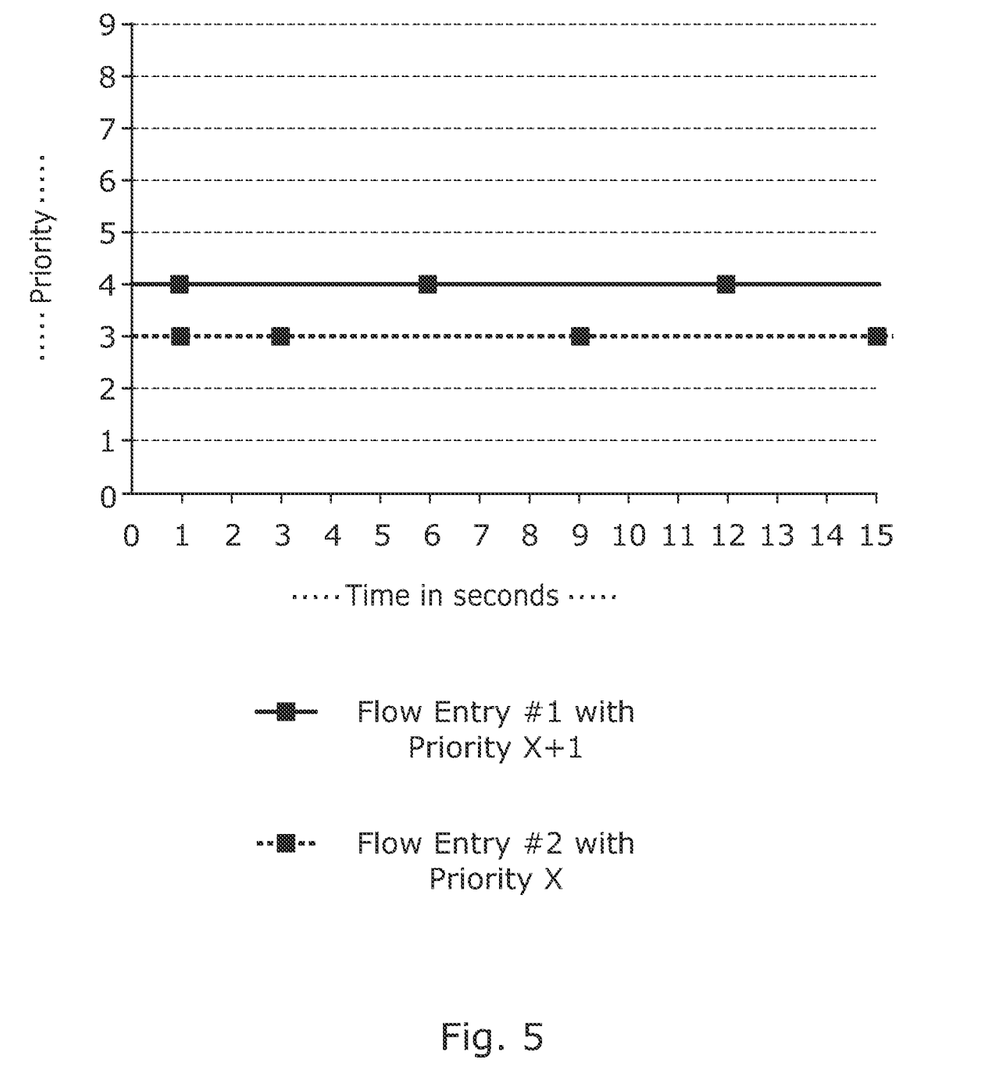
FIG. 5 shows an example of a graph according to the present disclosure.

FIG. 5 is a graph showing an example of a first flow entry and a second flow entry being refreshed alternately. The y-axis indicates the priority and the x-axis time. The first flow entry is shown in solid lines, while the second flow entry is shown in dashed lines. At time zero the first flow entry and the second flow entry are written to the forwarding table. The first flow entry and the second flow entry have the same match parameters and same action, but different priorities. In this way the first and second flow entries do not conflict with each other, even if they are active at the same time. In the graph the first flow entry has a priority of 5 and the second flow entry a priority of 4, but these numbers are just examples. A single fixed rate scheduler with a period of 3 seconds is used to refresh the first and second flow entries. At 3 seconds the first flow entry is refreshed. At 6 seconds the second flow entry is refreshed. At 9 seconds the first flow entry is refreshed again. At 12 seconds the second flow entry is refreshed again and at 15 seconds the first flow entry is refreshed again etc. The predetermined refresh period of 3 seconds is taken as an example, but other refresh periods could be used.

If a fixed singe rate scheduler is used then the period of time between each refresh will be a predetermined fixed time period T. As the first and second flow entries are refreshed alternately, the time period between consecutive refreshes of the first flow entry is 2 T and the time period between consecutive refreshes of the second flow entry is 2 T. For instance, in the above example the predetermined period T of the fixed rate scheduler is 3 seconds and thus there is a period of 6 seconds between each refresh of the first flow entry. There is also a period of 6 seconds between each refresh of the second flow entry.

In general the period of time between consecutive refreshes of a flow entry should be less than a timeout of the flow entry. Otherwise the flow entry may expire before it is refreshed. In the above example, if the timeout of first flow entry is 7 seconds then the timeout is longer than the refresh period of 6 seconds between consecutive refreshes of the first flow entry. Likewise, if the timeout of first flow entry is 7 seconds then the timeout is longer than the refresh period of 6 seconds between consecutive refreshes of the second flow entry.

As a single fixed rate scheduler is used in the above example, the time gap between a first flow entry being refreshed (e.g. at 3 seconds) and a second flow entry being refreshed (e.g. at 6 seconds) is the same as the time gap between a second flow entry being refreshed (e.g. at 6 seconds) and a subsequent refresh of the first flow entry (e.g. at 9 seconds). If two different schedulers are used then the first flow entry and the second flow entry may be refreshed at different rates, or at the same rate but with different offsets. However, the time between subsequent refreshes of a flow entry should still be less than any hard timeout of the flow entry.

Figure 6:
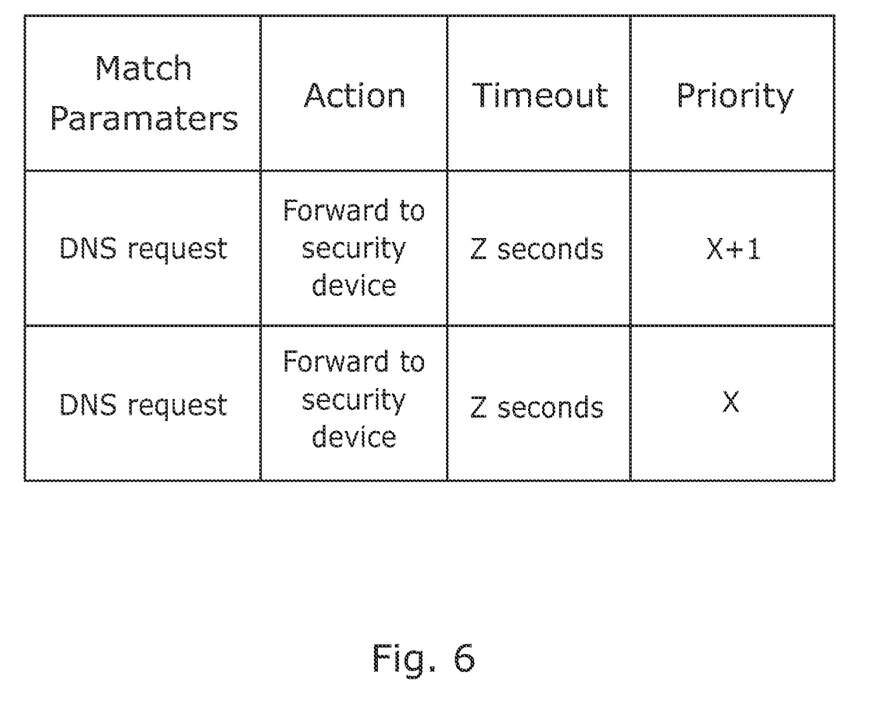
FIG. 6 shows an example of two flow entries according the present disclosure.

FIG. 6 shows an example of two flow entries 112 and 114 in more detail. Each flow entry includes a priority field, a match parameters field, an action field and a timeout field.

The first flow entry and the second flow entry have the same match parameters in the match parameters field. In the illustrated example, the match parameters are to match traffic DNS requests. For example, in Openflow this may be achieved by having a match field with IP Protocol set to UDP, Ethernet type set to IP and Destination Port set to 53. If an incoming packet has these values then it can be known that it is a DNS request. Other match fields such as incoming port, source medium access control (MAC), VLAN ID, Source Protocol Address, Target Protocol Address, Source Port, IP ECN and IP DSCP etc may be set to Any. In other cases some of these match fields may have particular values, for instance to restrict the flow entry to flows received on particular ingress ports of the network device.

In other examples, the match parameters may be to match all internet protocol (IP) packets or all address resolution protocol (ARP) packets, in which case in Openflow the match parameters would specify an Ethernet type of IP or ARP. In that way all traffic travelling outside a company network may be monitored. In still other examples, all traffic from a particular source address or ingressing on particular network device ports may be matched. That may be used to monitor traffic from a particular device, or particular access point, for instance guest devices that have temporarily joined the network.

The flow entry has an action field that specifies how a packet matching the flow entry is to be handled. In this example the action is to forward the packet to an external device, such as a security device. The action may for instance specify forwarding through a particular port that connects the network device directly to the security device, or modifying the packet header and forwarding through a port so that it is routed via the network to a particular device.

The flow entry has a hard timeout specifying a time after which the flow entry expires. After the hard timeout has expired, the flow entry may be deleted by the network device. It should be noted that a hard timeout is different from a soft timeout. A hard timeout specifies an absolute time period after which the flow entry ceases to be valid. A soft timeout specifies a time period after which a flow entry may be deleted if there has been no match and is reset each time a new packet matching the flow entry is received.

Soft timeouts are typically used to remove infrequently used flow entries, so as to conserve space. Hard timeouts may be used to prevent a network device indefinitely maintaining forwarding flows that are no longer be appropriate. For instance a network device may have a flow entry to re-direct flows to an external device, such as a network traffic monitor, or a security device. If the external device, or a software application on the external device that is to receive such flows, crashes or is no longer reachable, then packets forwarded according to the flow entry may be lost. A hard timeout limits the loss of traffic, because once the hard timeout expires the flow entry is no longer valid and traffic may be forwarded normally according to other flow entries in the network device. However, in a similar situation a soft timeout would be continually reset by incoming matching packets which would continue to be forwarded to the unreachable device.

In the current version of Openflow a hard timeout cannot be modified or reset by itself. Therefore a flow entry with a hard timeout is refreshed by deleting the entire flow entry and re-adding the flow entry, which takes time. However, even if future versions of Openflow, or other SDN protocols, allow a flow to be refreshed by resetting a hard timeout without modifying the rest of the flow entry, this will still take time, especially if the processor is busy. Thus having a first flow entry and a second flow entry with the same match parameters and action may help to prevent packets from escaping when one of the flow entries is being refreshed.

The priority of the first flow entry is different to the priority of the second flow entry. In the illustrated example the first flow entry has a priority of X+1 and the second flow entry has a priority of X. In this way the priority of the two flow entries is close, but different enough that they do not conflict. In other examples the difference in priority may be greater. If the flow entries are to divert incoming traffic, then both flow entries may have a relatively high priority relative to other flow entries in the forwarding table so as to ensure that these flow entries take priority over other flow entries that might not divert the incoming traffic.

Figure 7:
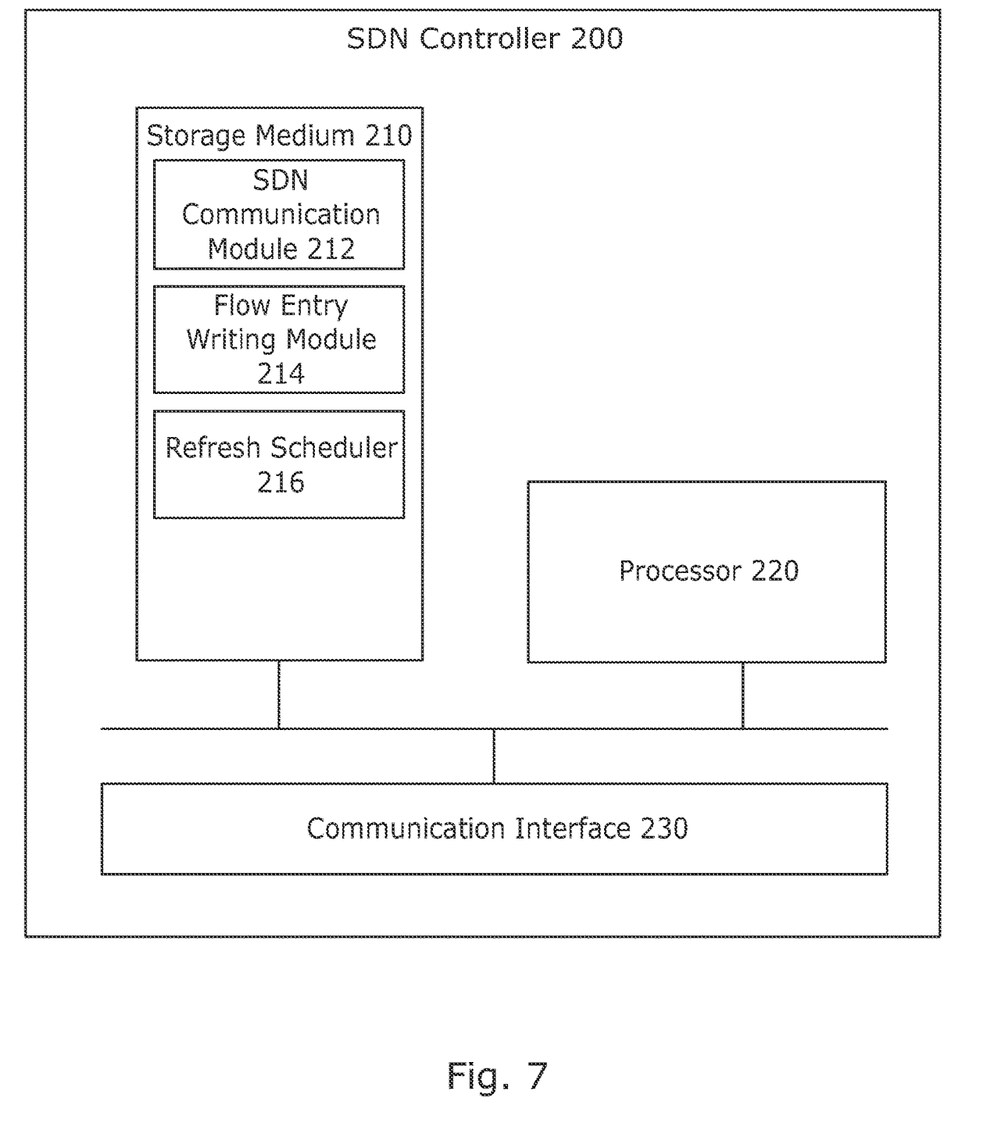
FIG. 7 shows an example controller according to the present disclosure.

FIG. 7 is a schematic example of a SDN controller 200 according to the present disclosure. The controller 200 includes a processor 220, a storage medium 210 and a communication interface 230. The processor, storage medium and communication interface may be connected by a communication medium such as bus. In one example the SDN controller is a server.

The communication interface may include a port for connection to a network, such as an Ethernet port, fiber optic port etc. The processor 220 may for example be a central processing unit (CPU), microprocessor or other processing device. The storage medium 210 may be a non-transitory storage medium such as random access memory (RAM), read only memory (ROM), a hard disk, solid state disk, a compact disk or digital video disk etc. The storage medium 210 stores modules of machine readable instructions which are executable by the processor to perform the methods described above.

The modules include a SDN communication module 212 to handle communications with SDN network devices. The SDN communication module may set up a SDN channel linking the SDN controller to a SDN network device and exchange messages with the SDN network device over the channel using a SDN protocol. A flow entry writing module 214 is to generate flow entries and instruct writing of the flow entries into a forwarding table of a SDN network device. The flow entry writing module is to generate a first flow entry and a second flow entry having the same match parameters and action. The first and second flow entries may have different priorities and may have respective timeouts which may be the same or different to each other. The refresh scheduler 216 is to trigger refreshing of the first flow entry and the second flow entry alternately. The refresh may be deleting and re-writing the flow entries, overwriting the flow entries or updating a field or a timeout of the flow entries as explained above. The refresh scheduler 216 may be a single fixed rate scheduler that triggers refreshing of the first flow entry and the second flow entry in alternating sequence every predetermined time period of the scheduler.

Figure 8:
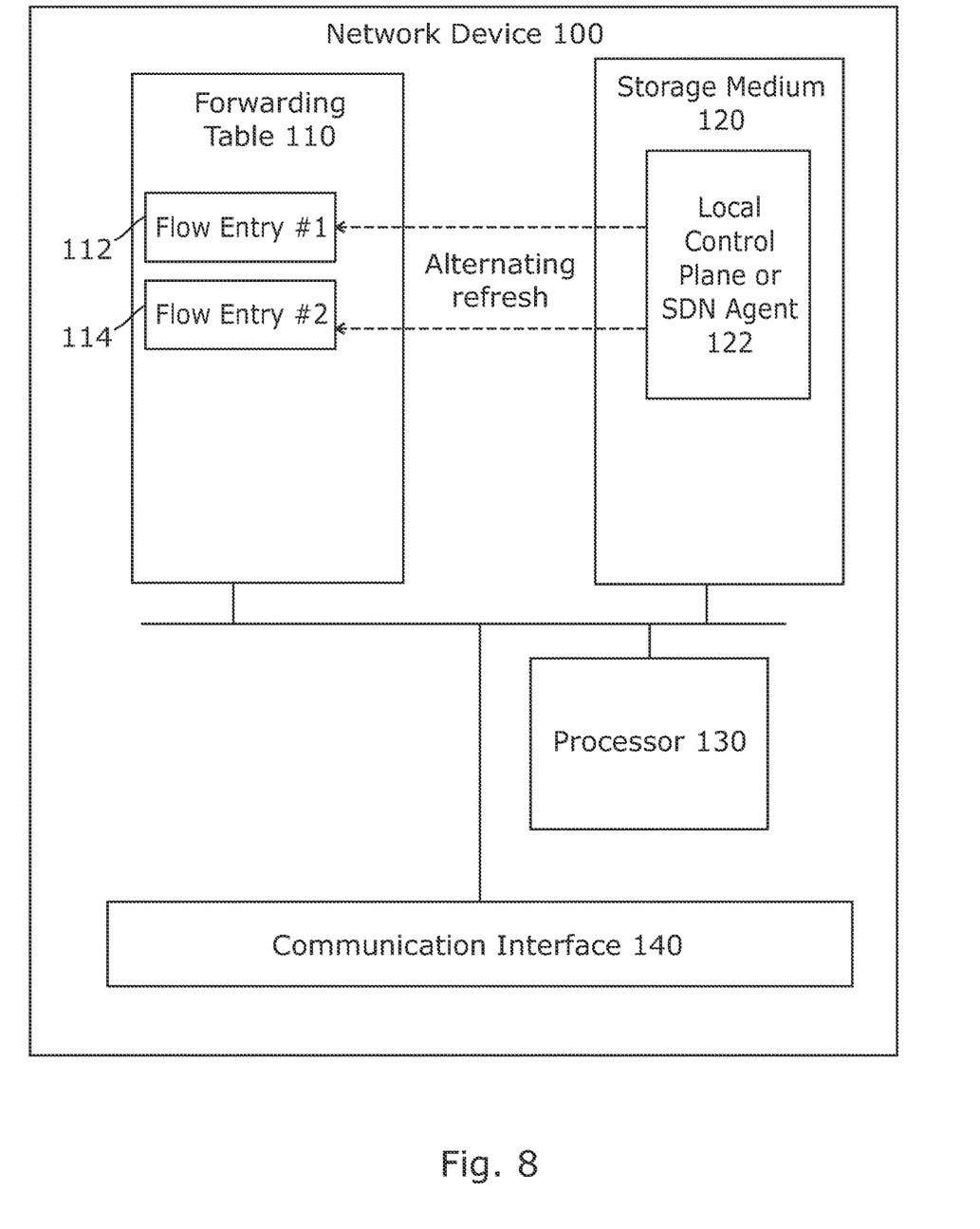
FIG. 8 shows an example network device according to the present disclosure.

FIG. 8 shows a network device according to the present disclosure. The network device may for example be a layer 2 switch, a layer 3 switch or a router etc. The network device includes a forwarding table 110, a storage medium 120, a processor 130 and a communication interface 140. These components may send or receive information to or from each other over a communication interface such as a bus, backplane or midplane etc.

The forwarding table 110 is a non-transitory storage medium and may for example be formed from a solid state memory, such as RAM, electronically erasable programmable read only memory (EEPROM), a hard disk, a content addressable memory (CAM) or ternary content addressable memory (TCAM). The forwarding table 110 stores flow entries, including a first flow entry 112 and a second flow entry 114. The first flow entry and the second flow entry have the same match parameters and action and may have different priorities and respective timeouts as discussed above.

The network device may forward incoming packets on the basis of flow entries stored in the forwarding table. A processor, such as an application specific integrated chip (ASIC) or field programmable gate array (FPGA) may be associated with the forwarding table and handle forwarding of the packets through the communication interface in accordance with actions specified by the flow entries in the forwarding table. The communication interface may include a plurality of ports, such as Ethernet ports, for connection to other devices and/or a network.

The processor 130 may be CPU, microprocessor other processing device and may execute machine readable instructions stored in the storage medium 120. The storage medium 120 may be a non-transitory storage medium such as random access memory (RAM), read only memory (ROM), a hard disk, solid state disk, a compact disk or digital video disk etc. The storage medium may store machine readable instructions to implement a SDN agent 122. The SDN agent communicates with a SDN controller and implements instructions received from the SDN controller. For instance upon receiving instructions from the SDN controller the SDN agent may add, remove or modify an flow entry in the forwarding table 110. In accordance with instructions received from the SDN controller the SDN agent may for example refresh the first flow entry 112 and the second flow entry 114 one after the other in an alternating manner. For example the refresh instructions may be received periodically from the SDN controller and the SDN agent may implement each refresh instruction when it is received.

In the above example the network device 100 is a SDN network device. In other examples the network device may be a non-SDN network device with its own local control plane, or a hybrid network device capable of supporting both SDN networking by a SDN agent and conventional networking with a local control plane. In one example, the network device may have a local control plane and the local control plane may carry out the methods described above with reference to FIGS. 1-6. That is the local control plane may write the first and second flow entries and instruct alternating refresh of the first and second flow entries. In the same way as for a SDN agent of a SDN network device, the local control plane of a non-SDN or hybrid network device is run by a processor. The processor may become busy at times causing delay in refresh of flow entries. Thus having first and second flow entries with the same match parameter and action, and refreshing the first and second flow entries alternately may help prevent incoming packets escaping due to a delay in refresh.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method comprising:
    writing, into a flow table, a first flow entry including match parameters, an action and a first priority;
    writing, into the same flow table, a second flow entry including match parameters, an action and a second priority, wherein the match parameters and the action of the second flow entry are the same as the match parameters and the action of the first flow entry and wherein the second priority is different from the first priority; and
    refreshing the first flow entry and the second flow entry alternately such that, when one of the first and second flow entries is being refreshed, the other one of the first and second flow entries remains active and incoming packets matching the match parameters are handled in accordance with the other one of the first and second flow entries that remains active.

2. The method of claim 1 wherein the action of the first flow entry is to divert packets matching the match parameters to a security device, traffic monitoring device or a SDN controller.

3. The method of claim 1 wherein refreshing the first flow entry and the second flow entry alternately includes a single fixed rate scheduler oscillating between instructing updating of the first flow entry and instructing updating of the second flow entry every predetermined time period.

4. The method of claim 1 wherein the first flow entry has as a first hard timeout and the second flow entry has a second hard timeout.

5. The method of claim 4 wherein a time period between consecutive refreshes of the first flow entry is less than the first hard timeout.

6. The method of claim 4 wherein a time period between consecutive refreshes of the second flow entry is less than the second hard timeout.

7. The method of claim 4 wherein the first hard timeout is greater than the sum of a first refresh period between refreshing the first flow entry and refreshing the second flow entry, and a second refresh period between refreshing the second flow entry and refreshing the first flow entry.

8. The method of claim 4 wherein a first refresh period between refreshing the first flow entry and refreshing the second flow entry is less than half of the sum of the first hard timeout and the second hard timeout.

9. The method of claim 4 wherein the first hard timeout is equal to the second hard timeout.

10. The method of claim 1 wherein a first refresh period between refreshing the first flow entry and refreshing the second flow entry, is equal to a second refresh period between refreshing the second flow entry and refreshing the first flow entry.

11. The method of claim 1 wherein refreshing the first flow entry and the second flow entry includes an application running on a SDN controller sending an instruction to a SDN network device to update the first flow entry or the second flow entry.

12. The method of claim 1 wherein refreshing the first flow entry and the second flow entry includes a local control plane of a network device updating the first flow entry and the second flow entry into a data plane of the network device.

13. The method of claim 1 wherein the match parameters of the first flow entry and the match parameters of the second flow entry are to match a domain name server (DNS) request, an address resolution protocol (ARP) request, or a predetermined IP address.

14. A non-transitory computer readable medium, storing machine readable instructions that are executable by a processor of a SDN controller to:
    send an instruction from the SDN controller to a SDN network device to write a first flow entry in a flow table of the SDN network device; the first flow entry including first match parameters, a first action and a first timeout;
    send an instruction from the SDN controller to the SDN network device to write a second flow entry in the same flow table of the SDN network device; the second flow entry including second match parameters, a second action and a second timeout; wherein the first match parameters are the same as the second match parameters and the first action is the same as the second action; and
    periodically refresh one of the first and second flow entries such that, when one of the first and second flow entries is being refreshed, the other one of the first and second flow entries remains active and incoming packets matching the match parameters are handled in accordance with the other one of the first and second flow entries that remains active.

15. The non-transitory computer readable storage medium of claim 14 method of claim 1 wherein the instructions include one single rate scheduler to refresh both the first flow entry and the second flow entry.

16. The non-transitory computer readable storage medium of claim 14 wherein a time period between subsequent refreshes of the first flow entry is less than a time period of the first timeout.

17. A controller including:
a network protection engine to write a flow entry and a backup flow entry to a same flow table of a SDN network device, the flow entry including forwarding instructions to divert a flow including a DNS request to a security device and a priority indicating the priority which the flow entry has relative to other flow entries; the backup flow entry including the same forwarding instructions as the flow entry, but having a different priority; and
a scheduler to oscillate between refreshing the flow entry and refreshing the backup flow entry without deleting the flow entry or the backup flow entry wherein the flow entry and the backup flow entry are refreshed such that, when one of the flow entry and the backup flow entry is being refreshed, the other one of the flow entry and the backup flow entry remains active and incoming DNS requests are handled in accordance with the other one of the flow entry and the backup flow entry that remains active.

18. The controller of claim 17 wherein the network protection engine is to include a hard timeout in the flow entry and a hard time out in the backup flow entry, the hard time out specifying a time period after which the flow entry or backup flow entry is to be deleted.

19. The controller of claim 17 wherein the scheduler has a predetermined time period and is to refresh one of the flow entry and the backup flow entry every predetermined time period.

20. The controller of claim 17 wherein the controller is a SDN controller or a local control plane of a network device.

* * * * *